Sept. 25, 1962 R. L. PLUNKETT 3,055,526
PLASTIC CAP
Filed Dec. 21, 1959 2 Sheets-Sheet 1
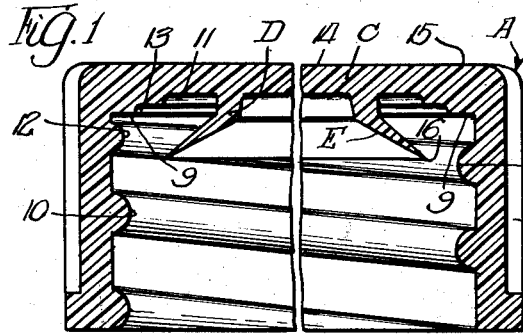
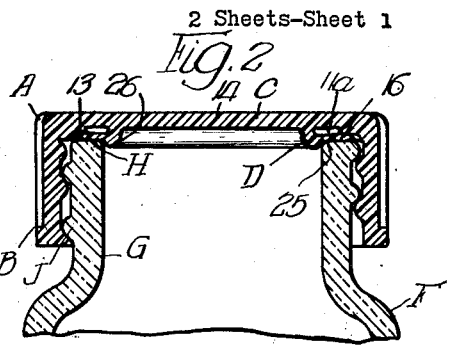
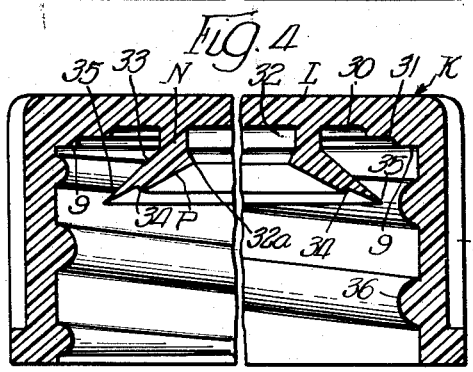
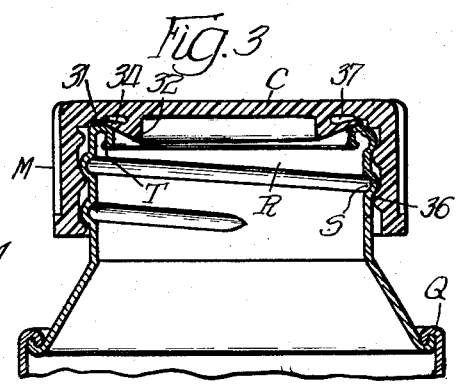
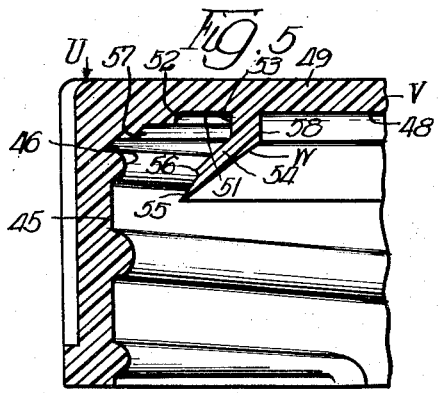
INVENTOR.
Robert L. Plunkett,
BY
Cromwell, Greist & Warden
Attys.

Sept. 25, 1962  R. L. PLUNKETT  3,055,526
PLASTIC CAP
Filed Dec. 21, 1959  2 Sheets-Sheet 2
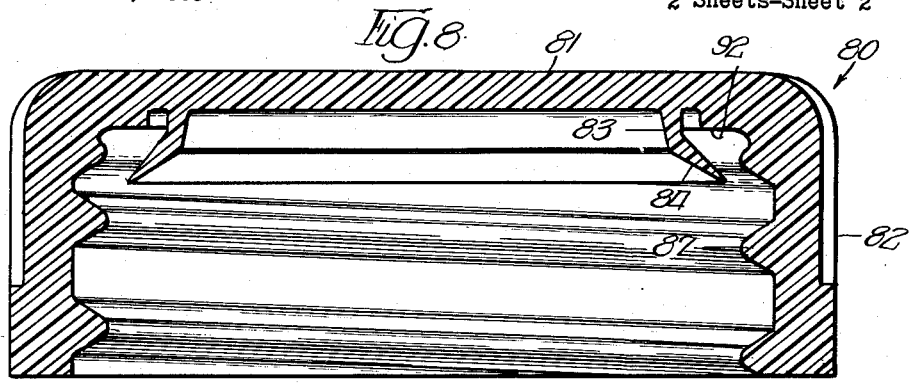
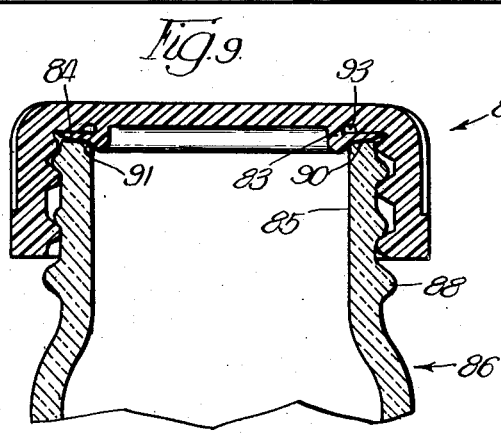
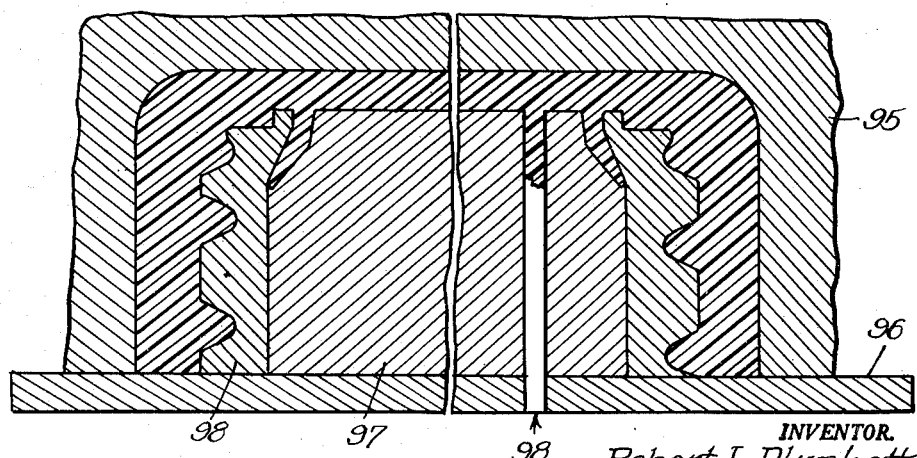
INVENTOR.
Robert L. Plunkett,
BY
Cromwell, Greist & Warden
ATTYS

United States Patent Office 3,055,526
Patented Sept. 25, 1962

3,055,526
PLASTIC CAP
Robert L. Plunkett, 14 Orsini Drive, Larchmont, N.Y.
Filed Dec. 21, 1959, Ser. No. 860,758
9 Claims. (Cl. 215—41)

This invention relates broadly to improvements and innovations in integrally molded one-piece plastic caps for bottles and other containers. More specifically, the invention relates to plastic screw caps having built-in or integral sealing fins suspended below the underside of the cap tops and eliminating the need for separate gaskets or liners.

Plastic bottle caps having separate gasket inserts or liners are well known. Such caps may be formed of brittle plastics such as various phenol formaldehyde resins or they may be formed of tough, non-brittle plastics such as polyethylene. However, the necessity of providing separate liners or gasket inserts not only increases the cost of these caps but they tend to make the caps messy on the inside, become separated and lost, and are generally undesirable for these and other reasons.

In accordance with the present invention, it was discovered that by providing a yieldable annular sealing fin flange of generally frusto-conical shape and suspended in cantilever fashion from the bottom of a support on the underside of a cap top, it was possible to mold such a cap integrally in one piece so that, in effect, it had its own liner or gasket. In use the sealing fin is flexed into re-entrant sealing engagement with the inner corner (inside top radius) of the sealing finish on the top of the bottle or container neck.

The object of the invention, broadly stated, is the provision on a quantity-production basis of inexpensive molded one-piece plastic caps of the above type having integral, built-in sealing fins which take the place of separate liners or gaskets.

A more specific object of the invention is the provision of plastic screw caps of the foregoing type wherein the integral sealing fin is supported in cantilever fashion on the bottom end of a center support depending from the underside of the cap so as to project into the upper end of the container or bottle neck thereby causing the fin to flex upwardly into re-entrant sealing engagement with the inside top radius of the neck.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory to form the cap of a moldable, tough, non-brittle plastic material of the intermediate rigidity which will be relatively rigid and form-sustaining and retaining in thick sectional wall area, and relatively thin and flexible in thin wall area. In general, moldable plastic materials may be used which have a percentage elongation at break of at least 50%. Among the commercially available plastic materials that qualify are: polyaliphatic polymers such as polyethylene and polypropylene; natural and synthetic rubber compounds; polyamides such as Zytel (i.e. nylon) and caprolactams; polystyrene; poly-halide aliphatic polymers such as Teflon (i.e. tetrafluoroethylene polymer) and Kel-F (i.e. monofluoroethylene polymer) and Delrin.

It has been found that a rigid low pressure polyethylene plastic constitutes a satisfactory plastic for general purpose and that the cap body may be made in a relatively thick, molded wall section, while the inner sealing structure consisting of the depending support and integral internal sealing flange or fin may be made of a relatively thin wall section.

In the preferred form of the invention, the base or top panel of the molded cap is made of appreciably thinner wall section than the cylindrical internally threaded skirt or wall section. Then, depending from the underside of the top panel will be a relatively wide cylindrical support column molded integrally therewith. This column serves to support an oblique, outwardly directed sealing fin or flange of decreased cross section which may terminate in a thin edge.

One important feature of the present invention resides in the fact that the thin edge may be forced upwardly and against the base of the screw cap when the top of a jar or metal container is threaded into position thereby forming a seal with an air pocket being positioned inside of the compressed and deformed oblique fin.

Another important feature of the invention resides in the annular sealing fin or flange engaging the inside top radius of the bottle neck sealing finish with a substantial downward sealing pressure while flexed upwardly in a re-entrant direction.

In the preferred form of the invention the cylindrical projection portion or central support extends slightly below the sealing surface or finish of the container neck so as to form a bulge inside of the neck of the jar or can, as the case may be.

Then the interior of the top panel or base may be stepped or shouldered quite deeply right along side of the exterior of the cylindrical support so as to form an air pocket, and then is more lightly shouldered or is provided with a more shallow shoulder to receive the edge of the oblique sealing fin and enhance the sealing effect.

Thus the top of the jar or can, as its externally threaded neck is screwed into the skirt of the cap, will cam up the obliquely downwardly and upwardly projecting sealing fin until finally the edge of said fin is pressed upwardly into the peripherally shallow recess forming the seal for the top of the jar or container, as the case may be.

In the drawings wherein like reference characters denote corresponding parts throughout the several views:

FIG. 1 is a broken transverse vertical sectional view of one form of cap, according to the present invention, with the internally sealing fin extending obliquely downwardly and outwardly from the interior face of the base of the cap.

FIG. 2 is a transverse vertical sectional view, on smaller scale, similar to FIG. 1 showing the cap as applied to the top of a jar with the sealing fin being elevated and compressed into sealing position.

FIG. 3 is a transverse vertical sectional view similar to FIG. 2 of an alternative form of a cap with a shouldered fin with the cap screwed down upon the screw top portion of a can and with the shouldered fin compressed into position against the top of the container.

FIG. 4 is a broken transverse sectional view similar to FIG. 1 of the alternative embodiment of FIG. 3 in which the downwardly and outwardly obliquely projecting, tapering sealing fin is shouldered so as to more closely fit and seal itself against the top bead of a jar or container.

FIG. 5 is a transverse vertical sectional view of one-half of an alternative embodiment in which the shoulder is placed upon the internal face of the sealing fin so that when pressed upwardly such shoulder shall engage the edge of the recess in the interior base of the cap.

FIG. 6 is a sectional view of one-half of an alternative embodiment showing the cap as molded in a one piece mold as a result of the first operation with the peripheral tab or fin extending peripherally downwardly from the interior of the base of the cap.

FIG. 7 is a sectional view of one-half of the same embodiment as FIG. 6 showing the second stage of the foundation of the cap of FIG. 6 when the downwardly projecting fin of the cap is hit by an anvil or with heat to cause it to extend obliquely outwardly.

FIG. 8 is a transverse vertical sectional view on enlarged scale through a screw cap forming still another embodiment of the invention.

FIG. 9 is a transverse vertical sectional view showing the condition of the annular sealing flange when the cap of FIG. 8 is screwed down on a bottle neck; and, FIG. 10 is an enlarged transverse sectional view through mold parts showing the manner in which the cap of FIG. 8 may be injection molded.

Referring to FIG. 1, there is shown a molded screw cap A having a cap body formed by a skirt or cylinder-like portion B and a top panel or base C.

This cap A may, for example, be molded of rigid polyethylene resin which, in thick wall sections such as indicated at B and C, will be relatively rigid. Extending downwardly from the interior face of the base C is a cylindrical ridge D which constitutes a depending central support for an obliquely outwardly and downwardly extending terminal or sealing fin E. The fin E thus depends in cantilever fashion from the bottom of the support C.

The thinner wall cross section E, of the same resin as forms the base C and the skirt B, will be flexible and compressible.

Generally, the wall B is interiorly molded with a screw thread 10. Peripherally extending around the cylindrical projecting portion D is a recess 11 which extends about half the radial distance to the interior screw face 12 on the skirt B.

Beyond this recess 11 is a wider and usually more shallow recess 13 which extends substantially to the screw face or top edge of the screw elements 12.

The base portion 14, interiorly of the depending cylindrical projection D, will be thinner than the exterior base portion 15 so as to give a slight additional resiliency thereto. The cylindrical portion D should also be of decreasing thickness downwardly, while the obliquely extending fin E desirably extends at its lower edge 16 to closely adjacent the last thread 17 and tapers off to a fine edge, as indicated at 16.

Referring to FIG. 2, there is shown a glass jar F having a molded neck portion G with a top sealing finish or edge H and an outer screw portion J.

As the neck G is screwed into the cap of FIG. 1, the top bead or sealing edge H will contact the interior oblique face of the fin E and press it upwardly.

It will be noted that the interior edge 25 (i.e. the so-called inside top radius of the sealing finish) will contact the interior face of the fin E outside of the cylindrical portion D and that the thin edge 16 at the extremity of the fin E will be forced into the shoulder recess 13 and will substantially fill such recess for the entire periphery of the cap, as best shown in FIG. 2.

In the final sealing position of FIG. 2, it will also be noted that the lower portion 26 of the cylindrical structure D will project downwardly inside of the mouth of the jar F and will be below the compressed surface of the fin E after it has been flexed to the re-entrant condition and lodged in the recess 13.

An air pocket 11a will be formed and maintained in conjunction with the recess 11 as shown in FIG. 2 when the cap A is fully screwed down.

The seal which is obtained in FIG. 2 will be adequate to hold vacuum, liquid or air under varying atmospheric conditions and with changes in temperature ranging from 10 to 50 degrees with confidence that no outside air will leak into the air space of the jar and with further assurance that there will be no escape of liquid or gas contents from the jar into the atmosphere.

The air pocket 11a of the cap will give a slight buffering effect and will take up irregularities in the top sealing edge H of the jar and downward bulge 26 of the cylindrical portion D, together with the upwardly compressed fin E, as shown in FIG. 2, to give a most satisfactory seal without an extra gasket and without any special liners being employed.

In the embodiment of FIG. 4, there is shown a cap K having a top panel or base section L and a skirt or side wall section M with a cylindrical depending support portion N and a shouldered, oblique, projecting sealing fin P.

The shallow recesses 30 and 31 may extend peripherally around the exterior of the cylindrical projection N and this projection N may have an interior shoulder 32a at its lower edge 32. The fin P has a thicker junction portion at 33; is shouldered at 34; and tapers to a thin section at 35. The interior of the skirt M is threaded, as indicated at 36.

The inward projection 32a at the interior lower end of the wall N may be omitted to enable the cap of FIG. 4 more readily to be removed from a two-piece mold.

In FIG. 3 is shown the cap of FIG. 4, as applied to a screw top metal can Q. This screw top metal can has a mouth portion R and a threaded side wall S with a top sealing bead T.

The thread S engages and screws into the thread 36 in the interior of the skirt or wall of the cap. The top bead T of the can Q will first strike and contact the thick section 33 as it is screwed into position and then will slide over past the shoulder 34 onto the thin section 35 which will then be compressed into the peripheral recess 31 forming an air pocket 37.

The edge 32 will project downwardly below the top of the bead T when the final seal is made.

As shown in FIG. 3, there is a firm, dependable seal made on top of a metal container top T without the use of an extra gasket or peripheral sealing means.

In the embodiment of FIG. 5 is shown a cap U having a base portion V and a side wall 45 and with the fin W extending obliquely downwardly in cantilever fashion from the cylindrical portion 58 which extends downwardly from the interior face 48 of the base V.

It will be noted that the skirt 45 has an interior thread 46.

It will also be noted that the peripheral recess or groove 51 curves at 52 into the outer recess 57 which receives the end of the fin W.

The fin or sealing wedge W has a thick section at 54 and a thin section at 55 with the intermediate shoulder 56. This intermediate shoulder 56 will engage the peripheral shoulder portion at 52 to form a seal, and the junction at 58 will bulge down interiorly of the jar or container when it is screwed into position, giving a seal, as the sealing fin W flexes to the re-entrant position.

With the caps of FIGS. 1 to 5, it is not necessary to exert either great force in screwing the caps on or loosening them, and the sealing fins E, P and W will retain their flexibility and sealing qualities even after hundreds of applications of the caps to jars or cans, as the case may be.

In the embodiment of FIGS. 6 and 7, the cap 76 is first molded with the skirt 75 having the thread 78. The oblique sealing fin 77 is integral with a cylindrical base portion 80 and has a tapered edge 79 which extends substantially vertically downwardly from the base of the cap 76.

By inserting a heated anvil within the skirt 75 or by heating the entire cap and using a cold anvil the fin 79 is bent more toward the horizontal so that it will take an oblique set as shown in FIG. 7.

The cap of FIGS. 6 and 7 avoids a two piece mold.

The central inside portions of the interior of the caps of FIGS. 1 to 7 may be ridged or grooved to carry various types of applicators which ordinarily would require a special costly ring cut annular gasket.

In the present construction the interior of the cap is free of all gasket material and therefore may enable other attachments.

When screwed down the top bead or sealing surface 25 of the jar F or the bead T of the can Q will always contact the peripheral oblique fin E or P outside the cylindrical portion D or N so that at least one-half to two-thirds of the tapered edge will contact the top sealing surface of the container while the interior portion will bulge down inside of the neck of the jar or can.

The inward and downward cylindrical projection portion may also serve as a means for attachment of internal elements and structures, such as internal brushes and the like.

Preferably, in FIG. 4 by way of example, the junction of the oblique fin P and cylindrical wall N should be at a level slightly below the level of the face 9 of the interior of the cap so as to project slightly inside of the mouth of the container as shown in FIGS. 2 and 3.

The thin edges of the fin P at 34 should also lodge in the shallow outside recess 31 and not in the inside recess 30. The extra projection 32a may be omitted.

The oblique sealing fin or tab along with the rest of the cap may be molded by injection of a rigid polyethylene powder such as put out by the Koppers Company, of Pittsburgh, or Philips Petroleum Company, of Bartlesville, Oklahoma, or W. R. Grace, Polymer Division, of Clifton, New Jersey.

The conventional polyethylene is generally too soft unless blended with low pressure rigid polyethylene. The preferred mold is a two-piece injection mold with a central removable portion which permits the oblique fin to be taken out of the mold after formation.

Referring to FIGS. 8–10, the integrally molded one-piece plastic screw cap designated generally at 80 therein constitutes a presently preferred embodiment of the invention. It has a cap body formed by a top panel portion 81 and a depending cylindrical skirt portion 82. The cap body is made sufficiently heavy or thick in section that it is for practical purposes rigid in use. When removed from a bottle it can be distorted under pressure but resumes its shape on release of pressure. When it is formed of rigid polyethylene, polypropylene, Teflon, polystyrene, or one of the other plastic materials mentioned above having similar properties, it is not brittle but tough-like.

There depends from the underside of the top panel 81 a central support 83. The central support 83 is in the form of a short circular column or flange and from the lower end depends an integral annular sealing fin 84 of outwardly tapered cross section. It will be seen that the fin 84 projects from the support column 83 in cantilever fashion. That is, it is supported at one end but the opposite end is free.

In FIG. 9 the cap 80 is shown screwed down on the exteriorly threaded neck 85 of a standard bottle 86 with the threads 87 on the interior of the cap skirt 82 threadedly engaging the exterior threads 88 on the bottle neck. The smooth rim or finish at the top of the neck 85 is indicated at 90 and the inside corner or inside top radius as it is referred to in the glass container art, is indicated at 91.

As shown in FIG. 9 with the screw cap 80 screwed down into closed and sealing position, it will be seen that the top sealing finish 90 is received adjacent to the junction of the top panel 81 and the skirt 82. When the cap is applied the sealing finish 90 engages the underside of the fin 84 and flexes it upwardly into the re-entrant condition or position as shown in FIG. 9. That is, instead of projecting outwardly and downwardly as in FIG. 8, the fin is bent reversely upward with the outer end or margin of the fin being pressed up against the inner margin of the top panel which is indicated at 92, thereby forming or closing off the annular air space 93 (FIG. 9).

It will be seen from FIG. 9 that the length or vertical dimension of the cylindrical support column 83 is such that it projects slightly down into the neck 85 when the cap 80 is screwed down. Also, it will be seen that the outer diameter of the support column 83 is such that it will thus project down into the neck.

The manner in which the cap 80 may be injection molded on a quantity production basis will now be described in connection with FIG. 10. There is a stationary outer mold member 95 and a reciprocal bottom mold member support plate 96 which supports an inner core element 97 and a mating thread core member 98 having thread formations thereon. The core 97 and member 98 are so connected with the plate 96 as to be movable in and out therewith. The core element 97 and base 96 are shown provided with a gate sprue 98 through which the plastic material for forming the cap 80 may be injected into the mold cavity formed between the inner surface of the outer mold member 95, the top of the core element 97, the exterior of the element 98, and closed by the plate 96. After the mold is closed by bringing the mold parts to the position shown in FIG. 10, the cavity is filled with the plastic material in accordance with well-known injection molding technique. The plate 96 is then withdrawn carrying with it the inner core element 97 and the thread core element 98. The annular sealing fin 84 is sufficiently flexible and yieldable so that these internal mold parts may be withdrawn simultaneously. By rotating the plate 96 and the parts thereon thread core member 98 is in effect unscrewed from the molded cap.

While the invention has been illustrated in connection with screw caps it will be appreciated that the thread formations on the caps and/or bottle necks can be interrupted and other means for detachable connection can be employed. For example, interengaging lugs on the caps and containers could readily be used.

Since these and other changes could be made in the above plastic screw caps and different embodiments of this invention could be made without departing from the scope of the claims, it is intended that all matter contained in the above description shall be interpreted as illustrative and not in a limiting sense.

This application is a continuation-in-part of my copending application Serial No. 658,567, filed May 13, 1957, now abandoned.

What is claimed as new is:

1. An integrally molded one-piece plastic cap having an integral built-in sealing fin for sealingly closing a container neck with a top sealing finish having an inside top radius, comprising, a cap body having a top panel and a depending skirt having means on the interior for effecting a detachable connection with said container neck so as to receive said top sealing finish adjacent the junction of said skirt and top panel, a central support for said sealing fin depending from the underside of said top panel and sufficiently small in outside diameter and long in vertical dimension to project down into said container neck, and a yieldable annular sealing fin projecting downwardly in cantilever fashion from the lower end of said central support for flexing into re-entrant sealing engagement with said inside top radius when said cap is connected to said container neck.

2. The cap of claim 1 formed of a material having properties of resilience and elasticity comparable to that of polyethylene.

3. An integrally molded one-piece plastic screw cap of generally cylindrical shape having an integral built-in sealing fin for sealingly closing an exteriorly threaded container or bottle neck provided with a top sealing finish having an inside top radius, said cap comprising, a cap body comprising a top panel and an interiorly threaded depending skirt for threaded engagement on said container neck so as to receive said top sealing finish adjacent the junction of said skirt and top panel, a central support in the form of a short circular column for said sealing fin depending from the underside of said top panel and sufficiently small in outside diameter and long in vertical dimension to project down into said container neck in spaced relation therewith, and a yieldable annular sealing fin projecting outwardly in cantilever fashion from the bottom end of said central support for flexing into re-entrant sealing engagement with said inside top radius when said cap is screwed down, said top panel and skirt being sufficiently thick to render said cap body rigid, and said fin being sufficiently long so as to extend into engagement with the underside of said top panel when said cap is fully screwed down.

4. The screw cap of claim 3 formed of polyethylene.

5. An integrally molded one-piece polyethylene sealing cap, capable of effective sealing without extra gaskets or liners, having a base and internally threaded screw skirt with a downwardly and outwardly projecting integrally formed sealing fin having a relatively thick cylindrical base connection to the central interior portion of the base and with the downwardly and outwardly projecting portion being flexible and being of decreasing thickness away from said base connection and being movable and compressible upwardly and outwardly against the interior of the base upon application to a screw neck jar, can or container, said base having a plurality of shallow recesses, an interior recess to form an air pocket and an exterior recess shaped to receive the edge of the fin when compressed against the interior face of the base so that the face of the fin will be flush with the face of the base.

6. An integrally molded one-piece polyethylene sealing cap, capable of effective sealing without extra gaskets or liners, having a base and internally threaded screw skirt with a downwardly and outwardly projecting integrally formed sealing fin having a relatively thick cylindrical base connection to the central interior portion of the base and with the downwardly and outwardly projecting portion being flexible and being of decreasing thickness away from said base connection and being movable and compressible upwardly and outwardly against the interior face of the base upon application to a screw neck jar, can or container, said fin being shouldered on its exterior face toward the screw neck so as to fit against the interior edge of the top bead of said screw neck.

7. An integrally molded one-piece polyethylene sealing cap, capable of effective sealing without extra gaskets or liners, having a base and internally threaded screw skirt with a downwardly and outwardly projecting integrally formed sealing fin having a relatively thick cylindrical base connection to the central interior portion of the base and with the downwardly and outwardly projecting portion being flexible and being of decreasing thickness away from said base connection and being movable and compressible upwardly and outwardly against the interior face of the base upon application to a screw neck jar, can or container, said sealing fin being shouldered on the opposite side from the screw neck of the jar, can or container, and the interior of the said base being provided with an edge to receive and contact said shoulder.

8. A molded all plastic cap structure having a circular base and an internally threaded depending skirt, a cylindrical neck projecting downwardly from the interior face of the base of the cap structure and an obliquely outwardly projecting flexible sealing fin of decreasing thickness outwardly to be pressed up against the interior face of the base to form a seal, said interior face of said base being circularly recessed around the outside of said neck and said recess receiving said flexible fin in sealing position, said fin and said recess being stepped and said stepped portions conforming to one another.

9. An integrally molded one-piece plastic cap having an annular integral sealing fin for sealingly closing a container neck having a top sealing finish, comprising a cap body having a top panel and a depending skirt having means on the interior for effecting a detachable connection with said container neck so as to receive said top sealing finish adjacent the junction of said skirt and top panel, a central support for said sealing fin depending from the underside of said top panel and having a diameter less than that of the interior of said container neck at said sealing finish, a yieldable annular sealing fin projecting outwardly from said central support so that the underside of said fin is engaged by said container top sealing finish and the fin is upwardly flexed, and circumferential shoulder means on the underside of said panel portion spaced outwardly of said central support and providing a bottom annular sealing surface for sealing engagement with the free outer end of said sealing fin when said cap is secured in sealing engagement on the container, and said central support and said shoulder means providing, respectively, the inner and outer sidewalls of an annular air pocket lying above said sealing fin, and said sealing fin providing the bottom wall of the sealed air pocket when said cap is secured in sealing engagement.

No references cited.